United States Patent [19]

Yamada

[11] Patent Number: 4,460,076
[45] Date of Patent: Jul. 17, 1984

[54] ELECTROMAGNETIC SPRING CLUTCH

[75] Inventor: Toshiaki Yamada, Higashiosaka, Japan

[73] Assignee: Matsushita Electric Industrial Co., Ltd., Kadoma, Japan

[21] Appl. No.: 376,497

[22] Filed: May 10, 1982

[30] Foreign Application Priority Data

May 12, 1981 [JP] Japan .................. 56-70903

[51] Int. Cl.³ .............. F16D 27/01; F16D 27/10; F16D 27/16
[52] U.S. Cl. .................. 192/35; 192/52; 192/81 C; 192/84 T; 192/103 R; 188/77 W; 188/267
[58] Field of Search .......... 192/18 B, 3.56, 84 T, 192/52, 81 C, 35, 103 R; 188/77 W, 163, 164, 267; 310/105

[56] References Cited

U.S. PATENT DOCUMENTS

| | | | |
|---|---|---|---|
| 2,927,472 | 3/1960 | Grant | 192/3.56 X |
| 3,215,234 | 11/1965 | Hirano | 192/35 |
| 3,709,342 | 1/1973 | Spencer | 192/52 |
| 3,741,353 | 6/1973 | McKinley et al. | 192/18 B |
| 4,078,719 | 3/1978 | Durland et al. | 188/164 X |
| 4,194,607 | 3/1980 | Yamaguchi | 192/184 T |

FOREIGN PATENT DOCUMENTS

| | | | |
|---|---|---|---|
| 1275880 | 5/1960 | Fed. Rep. of Germany | 192/3.56 |
| 1403682 | 8/1975 | United Kingdom | 188/267 |

Primary Examiner—Rodney H. Bonck
Assistant Examiner—James J. Merek
Attorney, Agent, or Firm—Cushman, Darby & Cushman

[57] ABSTRACT

An electromagnetic spring clutch comprises a driving member, to be driven by a belt, and a driven member, which is connected to a load shaft, and to which revolving power is to be transmitted from the driving member by a clutching coil spring.

One end of the coil spring is fixed to the driving member and the other end is fixed to a rotor which is freely rotatable and has several rotor windings, each shortcircuited.

A stator having several windings to be excited by a power source is disposed closely parallel to the rotor for electromagnetically braking it, to thus twist the coil spring and make it grip the driven member.

10 Claims, 12 Drawing Figures

ELECTROMAGNETIC SPRING CLUTCH

BACKGROUND OF THE INVENTION

1. Field of the Invention

The present invention relates to an improvement in an electromagnetic spring clutch.

2. Prior Art

Figure 1:
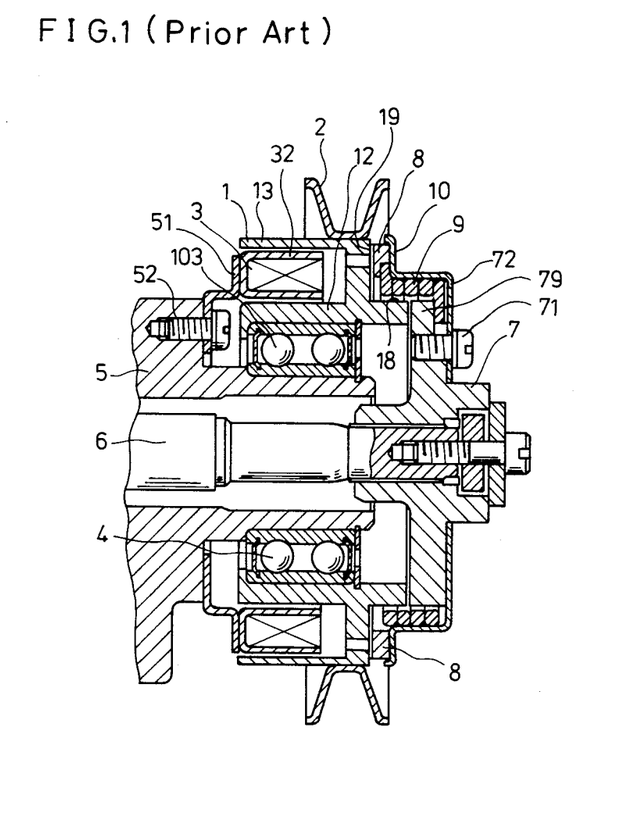
FIG. 1 is a sectional view of an exemplary conventional electromagnetic spring clutch.

An exemplary conventional electromagnetic spring clutch is constructed as shown by FIG. 1, which is a sectional view taken by a sectional plane including an axis of the clutch, wherein one end of a coil spring 9, which serves as mechanical coupling means, held on a flange part 79 of an output member or driven member 7, which is to be connected to a shaft 6 of a load machine. Numeral 72 shows a cover fixed by a screw 71 on the hub 7 or driven member. A revolving yoke 1 formed in a ring-shape and having a driving member, for example, a belt pulley 2 fixed integrally to the peripheral face thereof is rotatably journaled by ball bearings 103, onto a frame 5 of the load machine (not shown). An electromagnet 3 of a ring-shape is held in a stationary manner on a frame 51, which is fixed, for example, to the frame 5 of the load machine by a screw 52 or the like means. The electromagnet 3 is disposed in the revolving yoke 1 in a magnetic coupling manner, so that magnetic flux is induced even when the revolving yoke 1 is revolved by a driving belt (not shown) on the pulley 2. The magnetic flux flows through a path from an electromagnet yoke 32, through an inner cylindrical yoke part 12 with a substantially ring-shaped through-hole groove for magnetic isolation, peripheral part of the flange, fixed end of the coil spring 9, moving end of the coil spring 9 and an armature 8, an outer cylindrical yoke part 13 and to the electromagnet 3. When the electromagnet 3 is energized, the armature 8 is drawn to the contact face 19 of the revolving yoke 1 and the diameter of the coil spring 9 shrinks thereby coupling the peripheral part 79 of the flange or hub 7 and the clutching face 18 of the revolving yoke 1 by the coil spring 9. The above-mentioned conventional apparatus has the following problem:

(1) Because the armature 8 has zero revolution speed when it first touches the contact face 19 of the driving member 1, such first contact of the armature 8 to the contact face 19 of the revolving yoke 1 makes undesirable chattering (repetitions of many times of contacts and departs) and pulsive or vibrating slippage. Also the diameter shrinking of the coil spring 9 is made abruptly making transmitted torque and transmitted revolution speed too sudden or pulsively, causing an undesirable strong shock (sharp peak of torque). When the electromagnetic clutch of FIG. 1 used in a motorcar for coupling its air conditioner to the engine, the load to be driven by the shaft 6 is a pulsive load which changes load torque for the position of rotation of the shaft, such as refrigerant compressor of a morotcar, where the motor to drive the driving member 1 is a variable speed motor, that is an engine which makes many abrupt accelerations and decelerations of the driving speed. In such a case, both the motion of the hub 7 and the load is pulsive while the motion of the driving means 1 and the contact face 19 is also pulsive. Therefore, the coil spring 9 which couples the peripheral part 79 of the hub 7 and the clutching face 18, makes undesirable repetitions of tightening (hence coupling) and releasing (hence slippings). Such undesirable frequent slippings of the coil spring 9 causes slips between the coupling face of the coil spring 9 and clutching face 18 of the driving member 1, and then, both the coupling face and the clutching face 18 make considerable heats and abrasions on both parts.

(2) In the conventional construction, since the ring-shaped aramature 8 is made of a magnetic material of good magnetic conduction, it therefore can not be made of a highly abrasion-resistive material. Therefore, there is also a fear that the armature 8 may be torn as a result of frequent abrasions by the contact face 19, shortening the life of the clutch apparatus.

(3) In some configurations of the magnetic path and selection of the magnetic material, a magnetic hysteresis in the magnetic path has a considerable undesirable influence on the function of the magnetic attraction of the armature 8 to the contact face 19, resulting in incomplete decoupling of the armature 8, with an undesirable accidental friction thereof on the contact face 19. Therefore, undesirable heat and abrasion of the armature 8 take places, leading to further undesirable results' such as damaging of the load machine by malfunction of the clutch.

SUMMARY OF THE INVENTION

Therefore the present invention is intended to solve the above-mentioned problem and to provide a reliable spring clutch of long life.

The electromagnetic spring clutch in accordance with the present invention comprises:

a stator (13) comprising at least a winding (132)

a rotor (11) which is journaled (4) rotatably and has a secondary induction conductor (112) held in an electromagnetic coupling relation with respect to the winding (132), a driving member (1) which is for receiving a revolving force and journaled in a coaxial relation with the rotor (11), a driven member (7) for transmitting revolving power to a load to be connected thereto and a coil spring (9) fixed at one end to a part of the driving means (1) and at the other end to a part of the rotor (11), an intermediate part of the spring being disposed around a part of the driving member (1) and also a part of the driven member (7).

The electronic spring clutch in accordance with the present invention can effect a gentle or gradual coupling by means of suitably controlling exciting current to the winding (132) and subsequent reliable strong coupling without decoupling or slipping even at changes of fluctuations of driving power as well as load torque, thereby assuring reliable operation and long life of the clutch as well as the related machines.

DESCRIPTION OF THE PREFERRED EMBODIMENTS

Figure 2A:
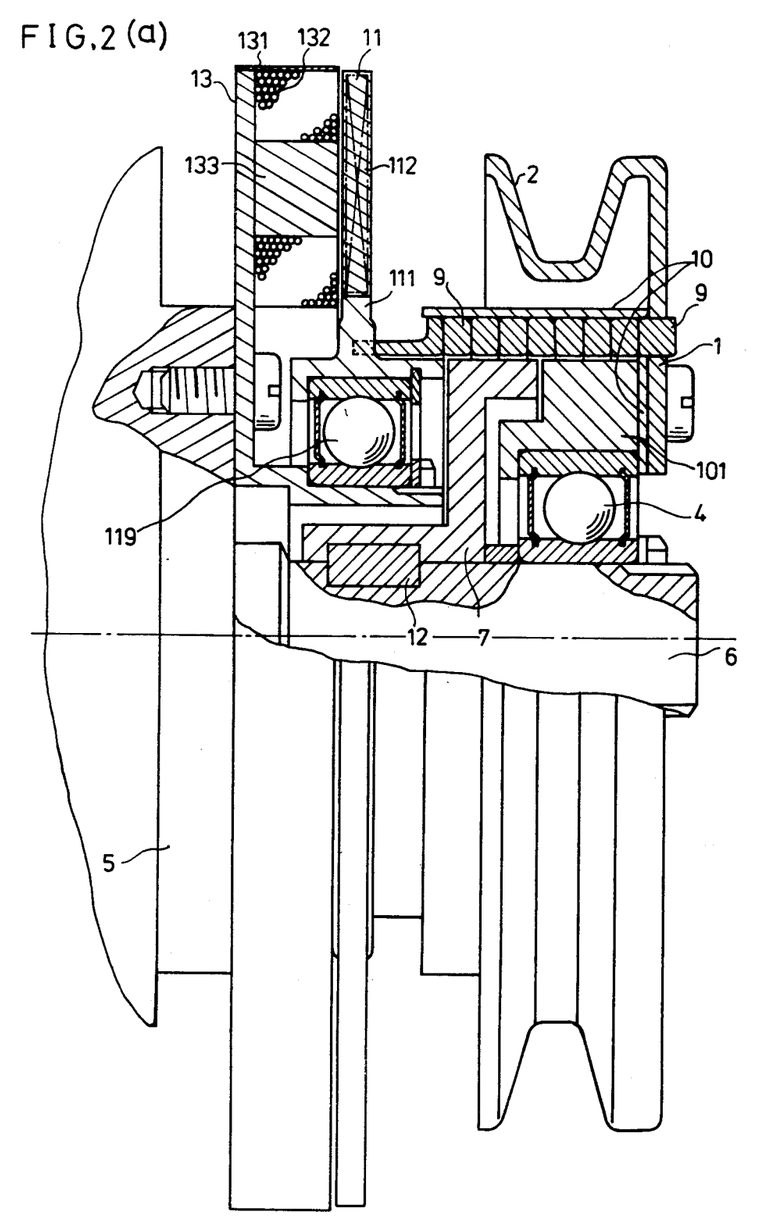
FIG. 2(a) is a sectional view of an example electromagnetic spring clutch embodying the present invention.
Figure 2B:
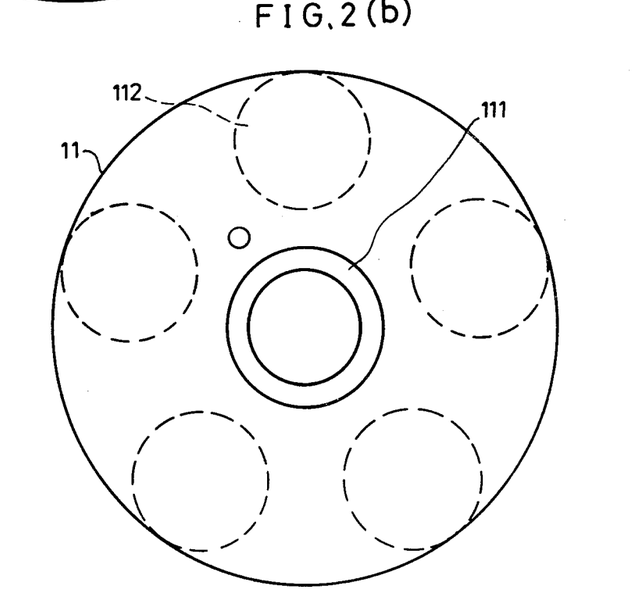
FIG. 2(b) is a front view of the rotor 11.

FIG. 2(a) is a sectional view of an example electromagnetic spring clutch embodying the present invention.

The electromagnetic spring clutch of FIG. 2 has a stator 13 having windings 132, a rotor 11 journaled by ball bearings 119 on a hub of the stator 13 and magnetically coupled to the windings 132, a driving member 1 having a belt pulley 2 and journaled by ball bearings 4, on a load shaft 6 a driven member 7 fixed to the load shaft 6, a coil spring 9 connected at one (right) end to the driving member 1 and at the other (left) end to the rotor 11. The rotor 11 has secondary induction conductors, each preferably a short-circuited flat-shaped rotor winding 112 molded or encapsulated in a plastic disk. The rotor 11 is rotatably journaled facing the stator windings 132 with a narrow air gap inbetween. The angular dispositions of the rotor windings 112 on the rotor 11 are shown in FIG. 2(b), and the angular dispositions of the stator windings 132 on the stator 13 are shown in FIG. 2(c). As shown by FIG. 2(b) and FIG. 2(c), the numbers and angular pitches of the rotor windings and the stator windings should be preferably different each other, and the ratio between them should be preferably of non-integer, so that a smoother electromagnetic braking operation is attainable. In a special case, the rotor may be a simple conductor disc of Al, Cu, Fe or soft ferrite. The driven member 7 is fixed to the shaft 6 of the load machine 5 by a key wedge 12. The hub 101 of the driving member 1 is journaled also by ball bearings 4 on the shaft 6, and a cover 10 is provided to cover the coil spring 9. The coil spring 9 in its normal or unstressed state has such an inner diameter as form a gap between its inner face and the outer face of the hub 101 of the driving member 1 and the driven member 7.

When the driving member 1 is rotated by a belt (not shown) engaging in the pulley 2 and the coil 132 is not energized, the coil spring 9 rotates at the same speed as the driving member 1 since the right end of the coil spring 9 is fixed to the driving member and the rotor 11 is freely rotatable. In this condition the coil spring 9 is substantially in its normal state having a gap between it and the outer faces of the hub 101 and the driven member 7. Thus, the driving member 1 and the rotor 11 revolve at substantially the same speed. It is preferable that the rotor 11 should have a small inertia of rotation, so that even on acceleration of the driving member 1, the rotor 11 follows the acceleration without substantial delay due to distortion of the coil spring 9 by the inertia of rotation. The light inertia of rotation is advantageous for making the design of the coil spring most appropriate for very frequent use and long time service.

During the revolution of the driving member 1 and the rotor 11, when the stator windings 132 are energized, the coupling of the clutch proceeds as follows. That is, at first, the magnetic fluxes of the stator windings 132 intercross the revolving rotor windings 112, and therefore by a known electromagnetic induction between two windings the rotor windings 112 receive braking work consuming induced current energies in the rotor windings 112 or in resistors connected in series to respective rotor windings. As a result of the braking action, the revolving of the rotor 11 delays from the main part of the driving member 1. Therefore, the coil spring 9 is twisted to decrease its inner diameter, and the inner faces of the coil spring 9 touch the outer face of the hub 101 of the driving member 1 and the outer face of the driven member 7. The clutch coupling is completed when the coil spring 9 tightly contacts the outer surface of the driven member 7 and makes the latter revolve integrally with the driving member 1. The driving torque is transmitted as shown by dotted arrows in FIG. 2(d). The time required for the process from the start to finish of coupling is arbitrarily adjustable by adjusting or controlling the exciting current of the stator winding 132.

In the clutch of the embodiment, even when the driving member 1, hence the rotor 11, is revolving at very high speed, an energization of the stator windings 132 by a moderate exciting current gives gentle braking action to the rotor 11, without any abrupt or noisy shock like the conventional one where the armature at a high revolution speed abruptly touches a stopping contact face making noises, shocks and abrasions. Such gentle braking action makes gradual and gentle contact of the inner face of the coil spring 9 onto the outer faces of the hub 101 and the driven member 7. Therefore, the transmission torque of the clutch of the embodiment can be desirably gradually increased without undesirable shock, noise and vibration.

The clutch is advantageous also when the load torque varies or driving revolution changes during the coupled state. This is because both ends of the coil spring are fixed between the driving member 1 and the rotor 11, both rotating substantially at the same revolution speed during the coupled state, while the relation between the rotor 11 and the stator 13 is only electromagnetic slip coupling which is far moderate than direct mechanical coupling of the conventional clutch. Therefore, the clutch coupling force is determined by the revolving speed of the driving member 1 and the electromagnetic induction coupling between the rotor windings 112 and the stator windings 112 only, and the coupling force is not at all influenced by the fluctuation of the load torque. Besides, since the inertia of rotation of the rotor 112 is selected to be small, the response of revolution speed of the rotor 112 is good, and accordingly, even on fluctuation of the revolving speed of the driving means 1, when the fluctuation is moderate, the coil spring 9 does not release the coupling.

FIGS. 3 to 7 show modes of operation of the embodiments.

Figure 3:
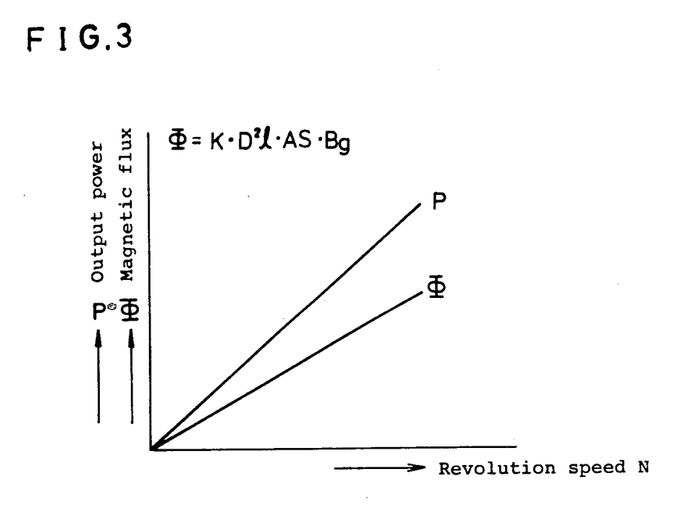
FIG. 3 is a graph of a mode of operation of an embodiment, showing a relation of revolution number N vs. output power P and magnetic flux Φ to cross the rotor coil.

FIG. 3 shows a mode of operation to give a coupling force P substantially proportional to the revolution speed N as shown by a curve P of FIG. 3. Such operation is attained by retaining the exciting current of the stator windings 132 substantially constant. By that the magnetic flux density Φ crossing the rotor coils 112 increases substantially in proportion to the revolution number N as shown by the curve Φ of FIG. 3. Therefore, as a result of gradual increase of the braking action to the rotor 11, the coupling force P increases in proportion to the revolution number N.

Figure 4:
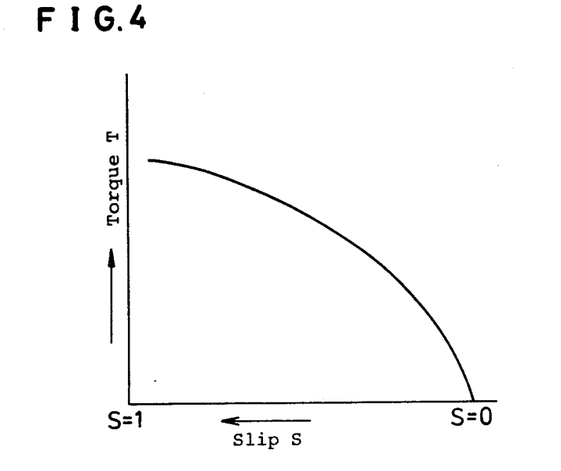
FIG. 4 is a graph of a mode of operation of an embodiment, showing a relation of slips vs. torque T.

FIG. 4 shows a mode where the stator 13 is operated to produce a revolving or pulsive-varying magnetic flux. The curve shows characteristics of increase of the electromagnetic braking torque with respect to change of magnetic slip, that is the relative revolving speed or effective electric angular velocity of the rotor 11 to the stator 13, when the magnetic flux of the stator 13 is kept constant. That is, the curve shows that the torque increases as the magnetic flux to cross the rotor coil 112 during one rotation in the mechanical angle of the rotor increases.

Figure 2C:
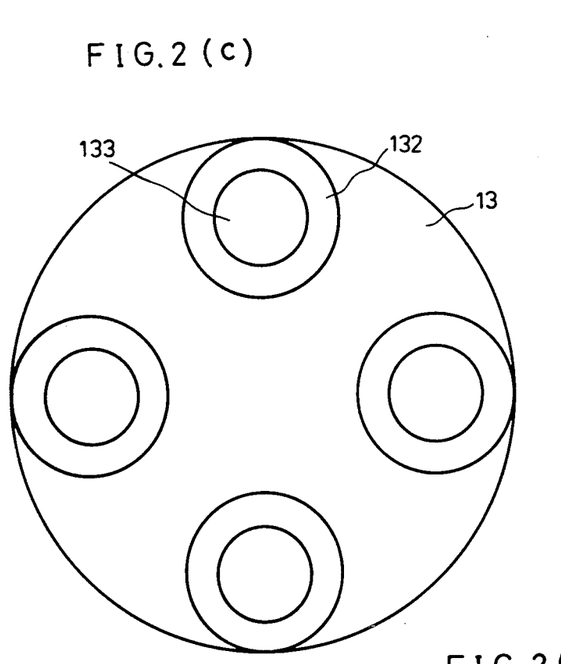
FIG. 2(c) is a front view of the stator 13.
Figure 2D:
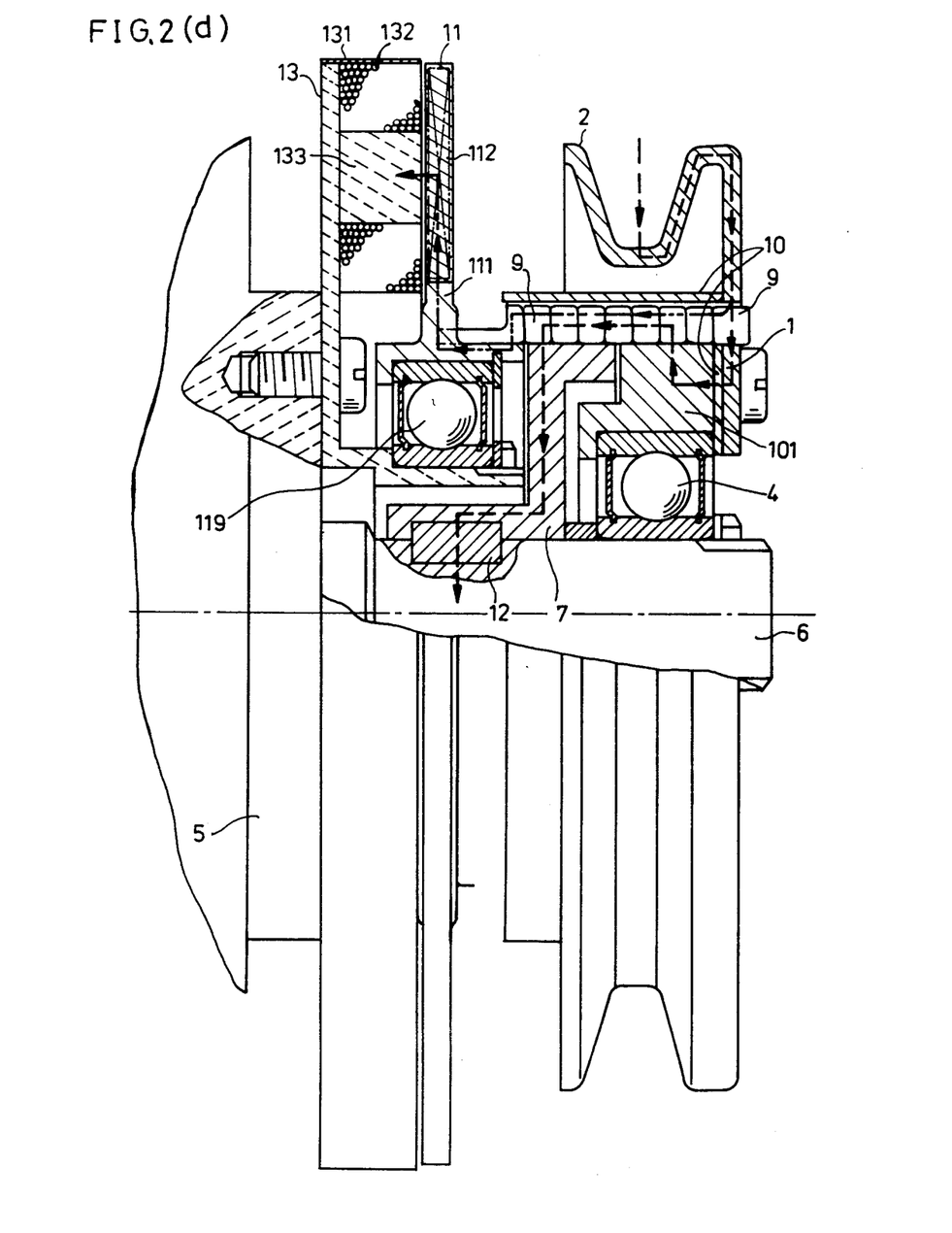
FIG. 2(d) is a sectional view of the example of FIG. 2(a) wherein transmission of the driving torque is indicated by dotted arrows.
Figure 5:
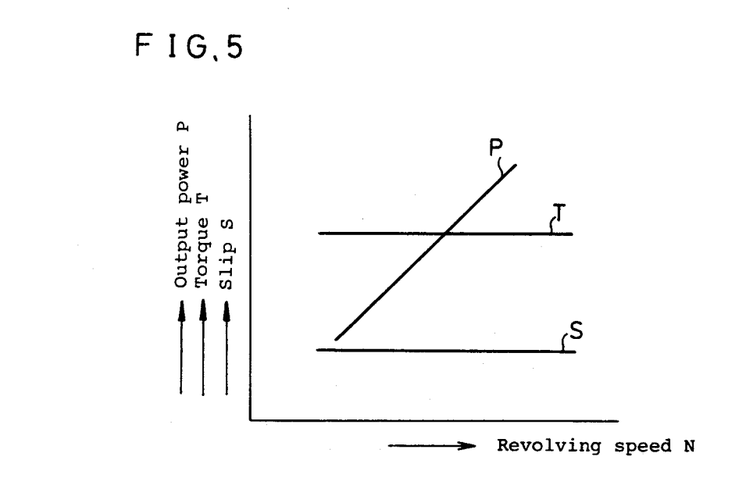
FIG. 5 is a graph of a mode of operation of an embodiment, showing a relation of revolution number N vs. slip S, torque T and output power P.
Figure 8:
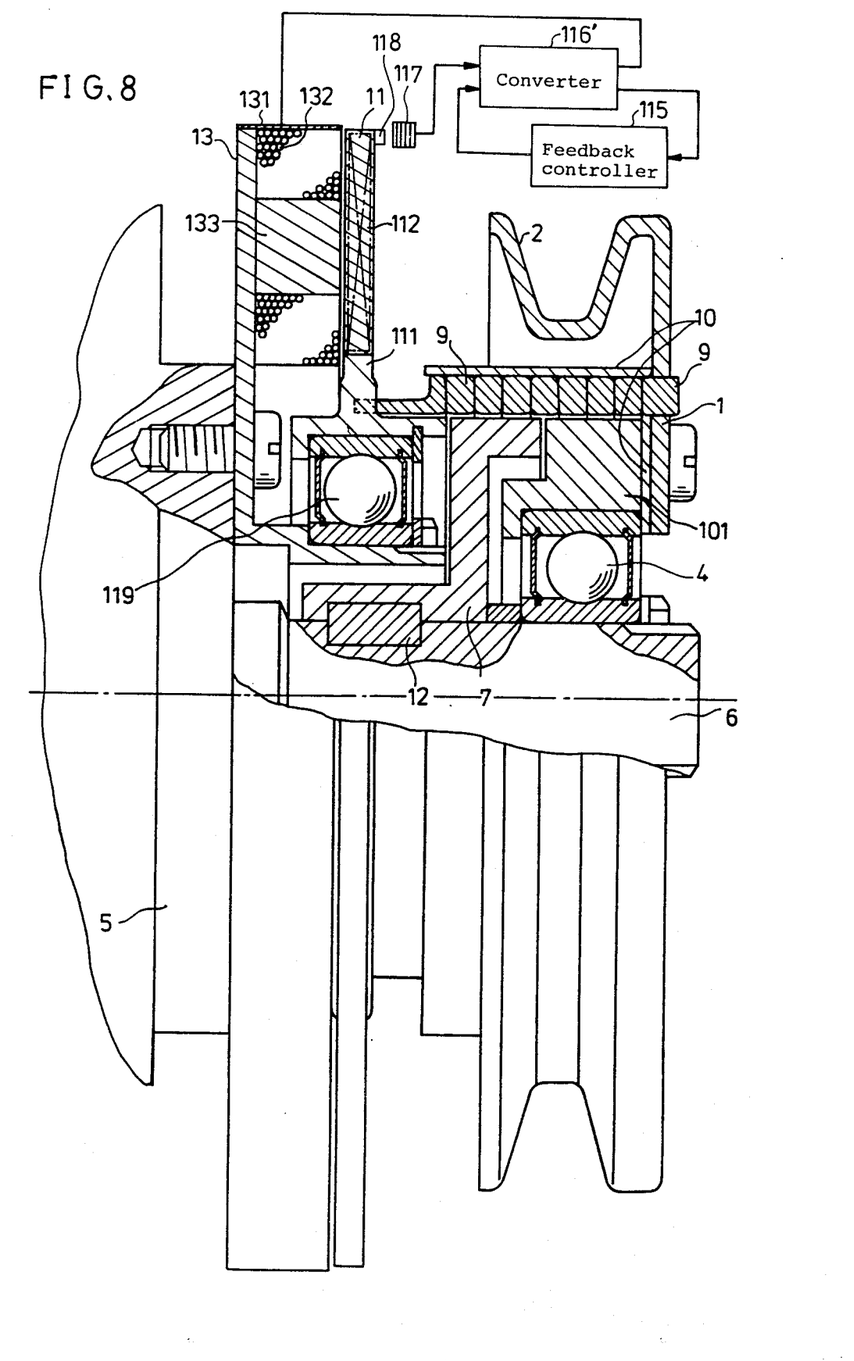
FIG. 8 is a circuit block diagram combined with a sectional view of the apparatus of another embodiment.

FIG. 5 shows a mode, where in a plural number of the stator coils 132 shown in FIG. 2(c), a predetermined mode of exciting current is fed, thereby producing a magnetic flux revolving around the axis of the stator with a predetermined angular speed. The exciting current is AC, DC pulse train or ripple currents with predetermined phase relations to each other. The frequency of the current to be supplied to the stator coil is controlled in such manner that the revolving speed of the magnetic field of the stator 13 is slower than the mechanical angular velocity of, or electromagnetic angular velocity of the revolving magnetic field of, the rotor 11. Such controlling of the current frequency is made by using a converter 116' as shown in FIG. 8 controlled by a timing signal given from a tachogenerator, which, for example, comprises a small permanent magnet 118 attached to the rotor 11 and a sensor coil 117. Selection of the frequency is made by adjusting a feedback controller 115 connected across the input end and the output end of the converter 116', and the controlling is made to retain the slip constant. Thereby, the torque can be retained constant, and the coupling transmission power (output power) has a constant torque characteristic wherein the energy is proportional to the revolution speed.

Figure 6:
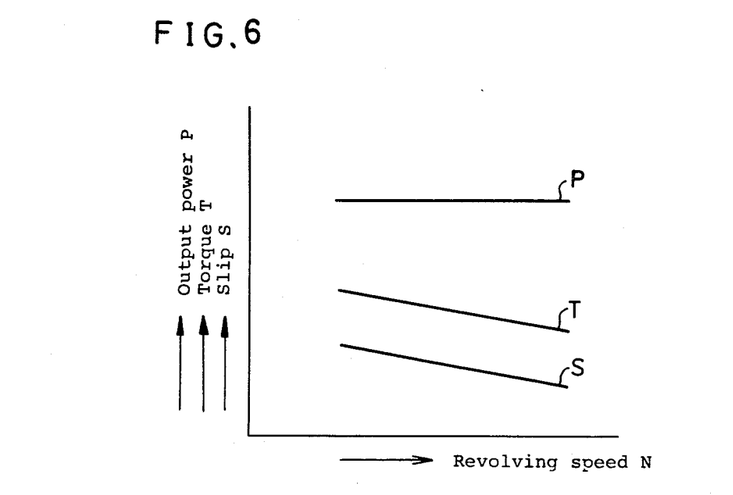
FIG. 6 is a graph of a mode of operation of an embodiment, showing a relation between revolution number N vs. slip S, torque T and output power P.

FIG. 6 shows a characteristic of a coupling operation of constant output power. Such operation is attainable, like the case of FIG. 5, by controlling the frequency of the converter in such a manner to decrease the slip as the revolving speed of the rotor increases.

Figure 9:
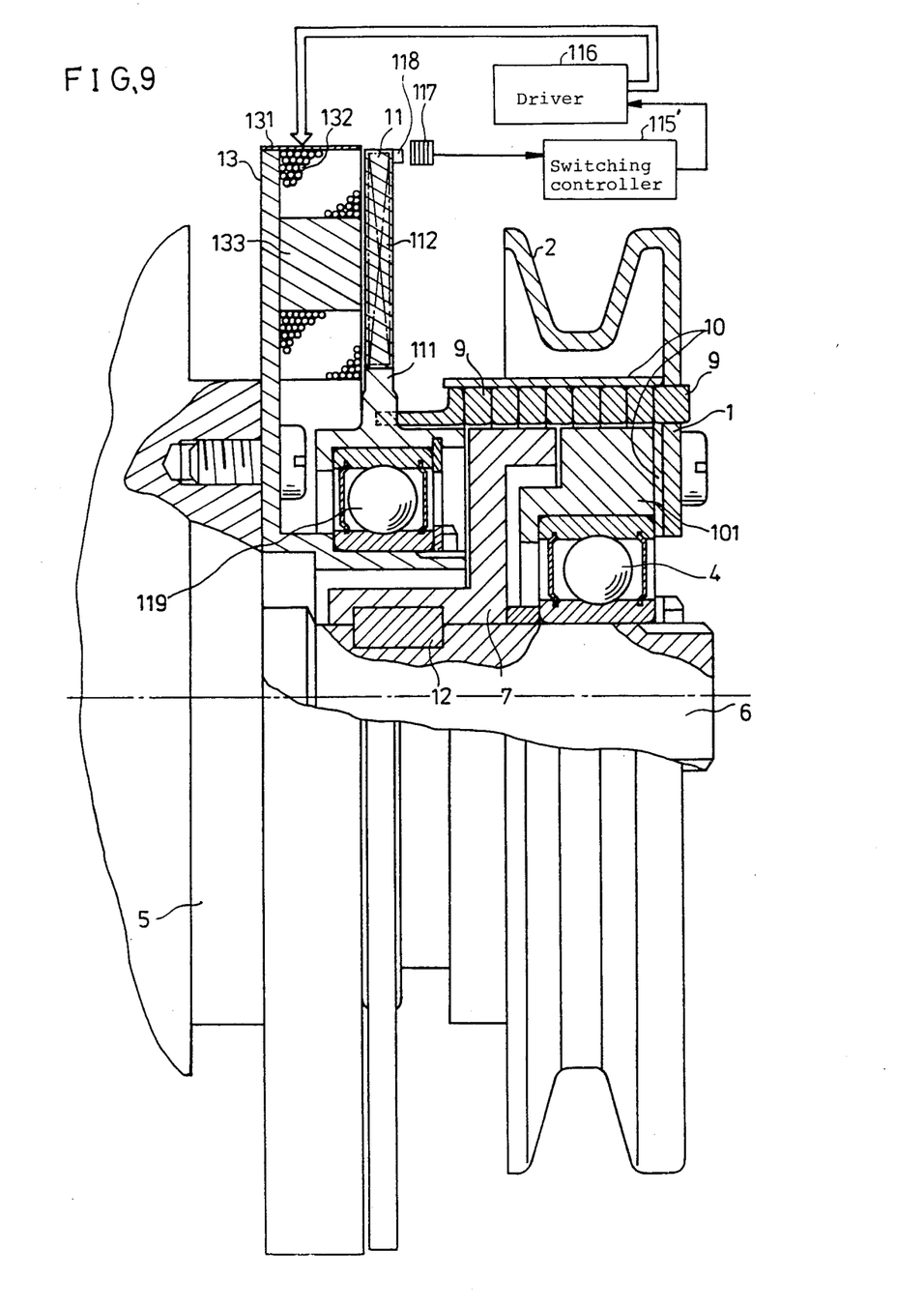
FIG. 9 is a circuit block diagram combined with a sectional view of the apparatus of another embodiment.

A further way of controlling the amount of the slip is attainable by changing the number of poles of the stator by switching the stator winding connections in a manner to increase or decrease the number of poles of the stator, thereby to increase or decrease the angular velocity of the electromagnetic flux of the stator responding to increase or decrease of angular velocity of the electromagnetic flux of the rotor. FIG. 9 shows a circuit construction for such changing of the pole number. Therein, the driver 116 to feed the exciting current to the stator windings 132 is controlled so as to changeover the winding connections, by the output of the switching controller 115', which works basing on the tachogenerator signal from the sensor coil 117.

Figure 7:
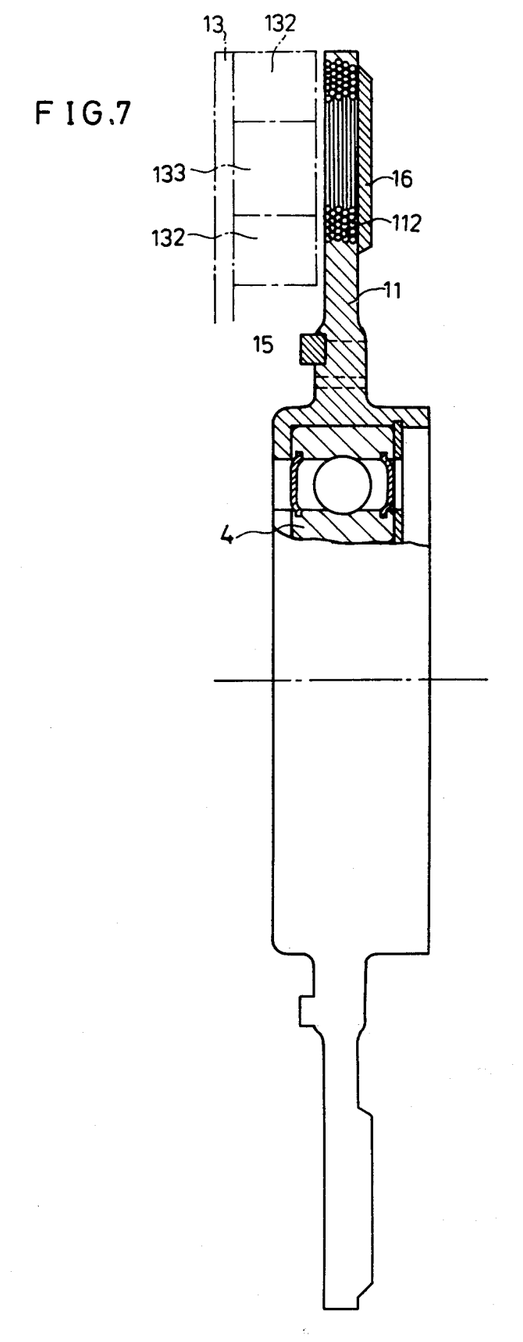
FIG. 7 is a detailed sectional view of the rotor 11 of the embodiment of FIG. 2.

FIG. 7 is a sectional view of an actual detailed embodiment of the rotor 11, wherein a body of rotor 11 has a predetermined number of winding 112 molded therein. Each windings 112 is shortcircuited by a resistor 15 fixed on the body. Cooling fins 16 are also provided on the surface of the rotor so as to cool the heat produced in the windings. Besides the molding of wound insulated wire coils, the windings 112 may be produced by vapor deposition of Al or the like metal film on a plastic disc. The resistors 15 connected in series to respective windings 112 serve to make the resistance of the closed circuit of each winding high, thereby to stabilize braking torque (induction coupling torque) and to decrease heat produced in the winding, hence enabling decreasing of weight of the copper winding leading to decreasing of inertia of rotation of the rotor 11.

When the rotor 11 is made by a simple copper disc or aluminum alloy disc, or by an electromagnetic core material, or by a plastic disc coated with a metal film coating thereon, an eddy current to be produced thereon also serves to enable the metal disc rotor 11 to work as a kind of secondary induction conductor, or a winding in function.

Furthermore, another configuration may be made that the rotor 11 is made by a permanent magnet and the stator 13 has windings thereon, both ends of the windings are to be shortcircuited preferably with a resistor inserted in series therewith.

What is claimed is:

1. An electromagnetic spring clutch comprising:
   a stator having an electrically excitable winding;
   a rotor fixed against axial movement and having a secondary induction conductor positioned in an electromagnetic induction coupling relation with respect to said winding, braking of rotation of said rotor being effected by exciting said stator winding;
   a driving member rotatable coaxially with said rotor;
   a driven member rotatable coaxially with said driving member; and
   a coil spring fixed at one end to said rotor and at the other end to said driving member and having an intermediate part coaxially surrounding a cylindrical part of said driven member, said intermediate part normally being out of contact with said cylindrical part but being contractable into gripping engagement therewith to drive said driven member on relative twisting movement between said spring ends effectible by braking of said rotor.

2. An electromagnetic spring clutch in accordance with claim 1 further comprising
   a power source to feed a controlled exciting current to said winding.

3. An electromagnetic spring clutch in accordance with claim 2 wherein
   said stator has a plural number of windings,
   said power source feeds one of an AC current, ripple current and DC pulse train current which is controlled by means of a converter, which is controlled by a timing signal responsive to revolving speed of said rotor, in a manner that angular velocity of the magnetic flux of said stator is slower than the angular velocity of said rotor, thereby to control induction coupling transmission power to be selected in a range from a constant torque characteristic to a constant power characteristic, through controlling of magnetic slip.

4. An electromagnetic spring clutch in accordance with claim 2 wherein:
   said stator has a plural number of windings, and including
   a revolution speed detector for said rotor,
   switch means to switch the connections of said windings to change the number of electromagnetic poles on said stator, said switch means being controlled by the output signal of said revolution speed detector in a manner to decrease or increase the number of said poles, thereby to increase or decrease the angular velocity of the electromagnetic flux of said stator responding to an increase or decrease of the angular velocity of said rotor.

5. An electromagnetic spring clutch in accordance with claim 2 wherein:
the body of said rotor is a permanent magnet, and
the power source feeds the windings with one of DC and AC current.

6. An electromagnetic spring clutch in accordance with claim 1 wherein said rotor has a plural number of windings, each being shortcircuited by a resistor, to form a closed circuit.

7. An electromagnetic spring clutch in accordance with claim 1 wherein said rotor is of electrically insulating and of high magnetic permeable substance having thereon said secondary induction conductor formed by a high electric conductive substance.

8. An electromagnetic spring clutch in accordance with claim 1 wherein said rotor is one of a rotary disk and a cylinder capable of forming eddy currents and serving also as said secondary inductance conductor.

9. An electromagnetic spring clutch in accordance with claim 1, wherein:
there are plural windings making plural magnetic poles, and including
a converter for controlling the exciting current and controllable by a signal responsive to revolving speed of the rotor, for controlling the slip quantity of said rotor and stator.

10. An electromagnetic spring clutch in accordance with claim 1 wherein the driving member has a cylindrical part coaxial with and of the same diameter as the cylindrical part of the driven member and the intermediate part of the spring also surrounds said cylindrical part of said driving member.

* * * * *